(12) United States Patent
Zhang et al.

(10) Patent No.: US 12,446,111 B2
(45) Date of Patent: Oct. 14, 2025

(54) MBS PROCESSING METHOD, COMMUNICATION APPARATUS AND STORAGE MEDIUM

(71) Applicant: JRD COMMUNICATION (SHENZHEN) LTD., Guangdong (CN)

(72) Inventors: Xin Zhang, Guangdong (CN); Jia Sheng, Guangdong (CN)

(73) Assignee: JRD COMMUNICATION (SHENZHEN) LTD., Guangdong (CN)

( * ) Notice: Subject to any disclaimer, the term of this patent is extended or adjusted under 35 U.S.C. 154(b) by 323 days.

(21) Appl. No.: 18/044,773

(22) PCT Filed: Oct. 23, 2020

(86) PCT No.: PCT/CN2020/123452
§ 371 (c)(1),
(2) Date: Mar. 9, 2023

(87) PCT Pub. No.: WO2022/082802
PCT Pub. Date: Apr. 28, 2022

(65) Prior Publication Data
US 2023/0371124 A1    Nov. 16, 2023

(51) Int. Cl.
*H04W 76/40* (2018.01)
*H04W 76/10* (2018.01)
*H04W 76/20* (2018.01)
*H04W 76/30* (2018.01)

(52) U.S. Cl.
CPC ........... *H04W 76/40* (2018.02); *H04W 76/10* (2018.02); *H04W 76/20* (2018.02); *H04W 76/30* (2018.02)

(58) Field of Classification Search
None
See application file for complete search history.

(56) References Cited

U.S. PATENT DOCUMENTS

| | | |
|---|---|---|
| 2016/0249266 A1 | 8/2016 | Kim et al. |
| 2020/0314700 A1 | 10/2020 | Da Silva et al. |
| 2023/0309185 A1* | 9/2023 | Hori ...................... H04W 76/30 |

FOREIGN PATENT DOCUMENTS

| | | |
|---|---|---|
| CN | 106031200 A | 10/2016 |
| CN | 111096062 A | 5/2020 |

OTHER PUBLICATIONS

International Search Report in International application No. PCT/CN2020/123452, mailed on Jul. 21, 2021.
(Continued)

*Primary Examiner* — Suhail Khan
(74) *Attorney, Agent, or Firm* — PV IP PC; Wei Te Chung

(57) ABSTRACT

The present disclosure provides a MBS processing method, a communication apparatus and a non-transitory storage medium. The MBS processing method comprises: receiving, in a non-connected state, an MBS start notification transmitted from a first base station, wherein the non-connected state comprises an RRC_INACTIVE state or an RRC_IDLE state; establishing a connection with the first base station in response to the MBS start notification so as to transit from the non-connected state to an RRC_CONNECTED state; receiving, in the RRC_CONNECTED state, a first MBS configuration transmitted from the first base station; and receiving a plurality of MBS data transmitted from the first base station based on the first MBS configuration.

20 Claims, 6 Drawing Sheets

(56) References Cited

OTHER PUBLICATIONS

Written Opinion of the International Search Authority in International application No. PCT/CN2020/123452,mailed on Jul. 21, 2021.
Ericsson. "Overview of NR MBS work item" 3GPP TSG-RAN WG2 #111e Tdoc R2-2007639, Aug. 28, 2020 (Aug. 28, 2020), chapters 1-2.
Huawei et al. "Discussion on multicast support for Idleinactive UEs" 3GPP TSG RAN WG1 Meeting #102-e R1-2005272, Aug. 28, 2020(Aug. 28, 2020), chapters1-3.
Huawei et al. "Idle/Inactive UE support for NR MBS" 3GPP TSG-RAN WG2 Meeting #111-e R2-2007029, Aug. 28, 2020(Aug. 28, 2020), chapters 1-3.
European Search Report in European application No. 20958384.8, mailed on Jun. 11, 2024.
Ericsson: "NR Multicast in Idle and Inactive mode", 3GPP Draft; R2-2007262, Aug. 7, 2020, XP051912061.
Ericsson, 38331_CR1663_(Rel-16)_R2-2005272_[E215][E216][E217][E218][E219], 3GPP tsg_ran\wg2_rl2, May 28, 2020.
Chinese Office Action issued in corresponding Chinese Patent Application No. 202080105336.8 dated Aug. 19, 2024, pp. 1-15.

\* cited by examiner

MBS PROCESSING METHOD, COMMUNICATION APPARATUS AND STORAGE MEDIUM

CROSS REFERENCE TO RELATED APPLICATIONS

The disclosure is a US national phase application based upon an International Application No. PCT/CN2020/123452, filed on Oct. 23, 2020, titled "MBS PROCESSING METHOD, COMMUNICATION APPARATUS AND STORAGE MEDIUM", which is incorporated by reference in the present application in its entirety.

BACKGROUND OF DISCLOSURE

1. Field of Disclosure

The present disclosure generally relates to wireless communications, and more particularly relate to MBS processing methods, a communication apparatus and a non-transitory storage medium.

2. Description of Related Art

Wireless communication systems and networks have developed towards being a broadband and mobile system. In cellular wireless communication systems, a user equipment (UE) is connected through a wireless link to a radio access network (RAN). The RAN includes a set of base stations (BSs). The set of base stations may provide wireless links to a plurality of UEs located in cells covered by the set of base stations. The set of base stations may further provide an interface to a core network (CN) which provides overall network control. As will be appreciated each of the RAN and CN may conduct respective functions in relation to the overall network.

The 3rd Generation Partnership Project (3GPP) has developed the so-called Long Term Evolution (LTE) system, namely, an Evolved Universal Mobile Telecommunication System Territorial Radio Access Network, (E-UTRAN), for a mobile access network where one or more macro-cells are supported by a base station known as an eNodeB or eNB (evolved NodeB). More recently, LTE is evolving further towards the so-called 5G or NR (new radio) systems where one or more cells are supported by a base station known as a gNB.

In NR, A multicast broadcast service (MBS) provides multicast service and/or broadcast service, while a Multimedia Broadcast Multicast Services (MBMS) provides multicast service and/or broadcast service in LTE. A plurality of User Equipment (UE) interested in a specific MBS can receive the same content at the same time. MBS has more stringent requirements for latency and/or reliability than MBMS.

SUMMARY

The present disclosure provides an MBS processing method executable in a UE, comprising: receiving, in a non-connected state, an MBS start notification transmitted from a first base station, wherein the non-connected state comprises an RRC_INACTIVE state or an RRC_IDLE state; establishing a connection with the first base station in response to the MBS start notification so as to transit from the non-connected state to an RRC_CONNECTED state; receiving, in the RRC_CONNECTED state, a first MBS configuration transmitted from the first base station; and receiving a plurality of MBS data transmitted from the first base station based on the first MBS configuration.

The present disclosure also provides an MBS processing method executable in a base station, comprising: transmitting an MBS start notification to a UE in a non-connected state, wherein the non-connected state comprises an RRC_INACTIVE state or an RRC_IDLE state; establishing a connection with the UE so as to transit the UE from the non-connected state to an RRC_CONNECTED state; transmitting a first MBS configuration to the UE in the RRC_CONNECTED state; and transmitting a plurality of MBS data to the UE based on the first MBS configuration.

The present disclosure also provides an MBS processing method executable in a UE, comprising: receiving, in a non-connected state, an MBS start notification and a first MBS configuration transmitted from a first base station, wherein the non-connected state comprises an RRC_INACTIVE state or an RRC_IDLE state; and in response to the MBS start notification, receiving a plurality of MBS data transmitted from the first base station based on the first MBS configuration.

The present disclosure also provides an MBS processing method executable in a base station, comprising: transmitting an MBS start notification and a first MBS configuration to a UE in a non-connected state, wherein the non-connected state comprises an RRC_INACTIVE state or an RRC_IDLE state; and transmitting a plurality of MBS data to the UE based on the first MBS configuration.

The present disclosure provides a communication apparatus, comprising a processor and a communication circuit, wherein the processor is connected to communication circuit; the processor is configured to execute instructions to implement any one of the MBS processing methods provided by the present disclosure.

The present disclosure provides a non-transitory storage medium storing instructions, wherein the instructions are capable of being executed to implement any one of the MBS processing methods provided by the present disclosure.

BRIEF DESCRIPTION OF DRAWINGS

To further illustrate technical solutions of embodiments of the present disclosure, drawings needed for description of the embodiments will be briefly introduced. Obviously, the following drawings are only some embodiments of the present disclosure. To any one of skill in the art, other drawings may be obtained without any creative work based on the following drawings.

DETAILED DESCRIPTION OF EMBODIMENTS

Figure 1:
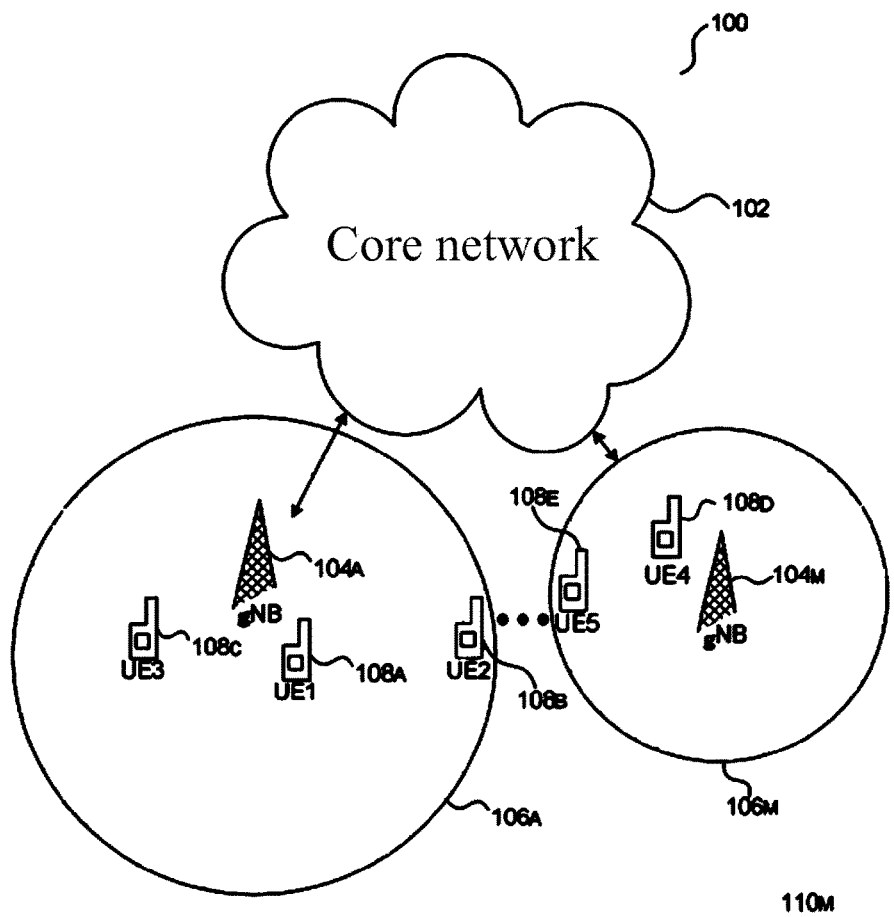
FIG. 1 is a structural schematic view of a wireless communication system or a wireless communication network according to an embodiment of the present disclosure.

To make any one of skill in the art to understand the technical solutions of the present disclosure, the MBS processing methods, communication apparatus and non-transitory storage medium provided by the present disclosure will be described in details by referring to the drawings and the embodiments. The ones in the following embodiments that do not conflict with each other may be combined with each other.

The term of "user equipment" in the present disclosure may include or represent any portable computing device for communication. In some embodiments of the described device, method, and system, applicable user equipments (UEs) may be wired or wireless devices, such as mobile devices, mobile phones, terminals, smart phones, portable computing devices such as laptops, handheld devices, tablets, tablet computers, netbooks, personal digital assistants, music players, and other computing devices capable of wired or wireless communication.

FIG. 1 is a structural schematic view of a wireless communication system or network 100 that includes a core network 102 (or telecommunications infrastructure) with a plurality of network nodes 104a-104m (e.g., base stations gNB) serving a plurality of wireless communication units 108a-108e (e.g., UEs) in cells 106a-106m. The plurality of network nodes 104a-104m are connected to the core network (CN) 102 via links. The links may be wired or wireless (e.g., radio communication links, fiber optics, etc.). The core network 102 may include a plurality of core network nodes, network entities, application servers, or any other network or computing device that may communicate with one or more wireless access networks including the plurality of network nodes 104a-104m.

In some embodiments, the network nodes 104a-104m are base stations, such as, but not limited to, gNB in a 5G network. Each of the plurality of network nodes 104a-104m (e.g., base stations) has a footprint. For example, as shown schematically in FIG. 1 for simplicity, the footprint may refer to the corresponding circular cells 106a-106m serving one or more UE 108a-108e. The UEs 108a-108e are capable of receiving services, such as voice, video, audio, or other communication services, from the wireless communication system 100.

The wireless communication system or network 100 may include or represent any one or more communication networks for communication between the UEs 108a-108e and other devices, content sources, or servers connected to the wireless communication system or network 100. The core network 102 may also include or represent a link, coupling, or connection to form one or more communication networks, one or more network nodes, entities, elements, application servers, servers, base stations, or other network devices of the wireless communication system or network 100. The link or coupling between the network nodes may be wired or wireless (e.g., radio communication links, fiber optics, etc.). The wireless communication system or network 100 and the core network 102 may include: any suitable combination of core networks containing network nodes or entities and wireless access networks, base stations, access points, etc., which enable the UEs 108a-108e, the network nodes 104a-104m of the wireless communication system 100 and the core network 102, content sources, and/or other devices connected to the wireless communication system or network 100 to communicate with each other.

In some embodiments of the described device, method, and system, applicable wireless communication networks 100 may be at least one communication network or a combination thereof, including but not limited to one or more wired and/or wireless telecommunications networks, one or more core networks, one or more wireless access networks, one or more computer networks, one or more data communication networks, Internet, telephone networks, wireless networks such as WiMAX, WLAN and/or Wi-Fi networks based on an IEEE802.11 standard as an example only, or Internet Protocol (IP) networks, packet-switched networks or enhanced packet-switched networks, IP Multimedia Subsystems. (IMS) networks or communication networks based on wireless, cellular or satellite technologies such as mobile networks, Global System for Mobile Communications (GSM), GPRS networks, Wideband Code Division Multiple Access (W-CDMA), CDMA2000 or LTE/Advanced LTE communication networks or any second, third, fourth or fifth generation and beyond type of communication networks etc.

As shown in FIG. 1, the wireless communication system 100 may be a 5G communication network using cyclic prefix orthogonal frequency division multiplexing (CP-OFDM) technology for downlink and uplink channels network. The downlink may include one or more communication channels for transmitting data from one or more gNB 104a-104m to one or more UE 108a-108e. Typically, the downlink channel is a communication channel for transmitting data, e.g., from gNB 104a to UE 108a.

Figure 2:
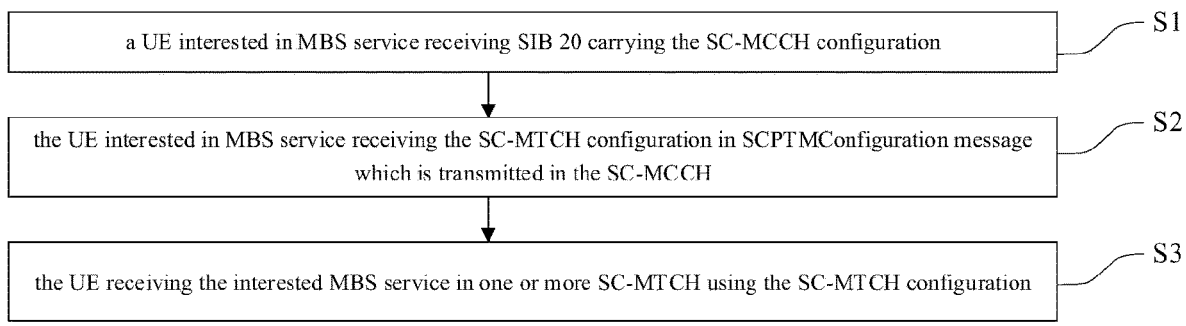
FIG. 2 is a flow chart illustrating a legacy Single Cell (SC)-Point-to-Multipoint (PTM) mechanism.

Referring to FIG. 2, FIG. 2 is a flow chart illustrating a legacy Single Cell (SC)-Point-to-Multipoint (PTM) mechanism. The legacy SC-PTM mechanism may comprise the following blocks.

At block S1: a UE interested in MBS service receives system information block (SIB) 20 carrying the SC-Multicast control channel (MCCH) configuration.

At block S2: the UE interested in MBS service receives the SC-MTCH configuration in SCPTMConfiguration message which is transmitted in the SC-MCCH;

At block S3: the UE receives the interested MBS service in one or more SC-multicast transport channel (MTCH) using the SC-MTCH configuration acquired in S2.

In SC-PTM, the configuration of PTM bearer is transmitted over SC-MCCH. The overall channel structure for SC-PTM is characterized by:

There is one SC-MCCH and one or more SC-MTCH (s) mapped on DL-SCH within a cell;

SC-MCCH and SC-MTCH transmissions are each indicated by a logical channel specific RNTI on PDCCH (there is a one-to-one mapping between TMGI and G-RNTI used for the reception of the DL-SCH to which a SC-MTCH is mapped).

Figure 3:
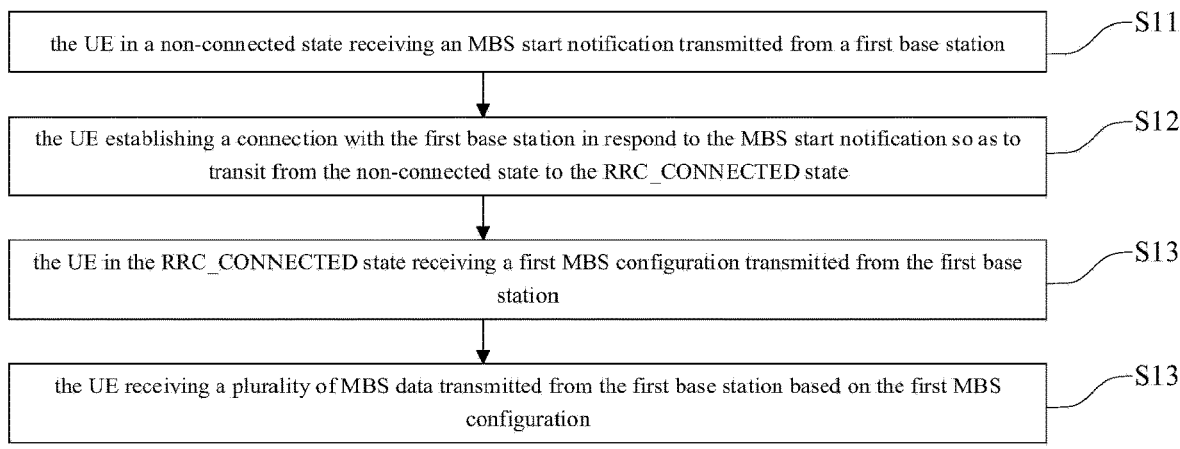
FIG. 3 is a flow chart illustrating a first embodiment of the MBS processing method according to the present disclosure.

Referring to FIG. 3, FIG. 3 is a flow chart illustrating a first embodiment of the MBS processing method according to the present disclosure. The present method can be executable in a UE. The method according to the present embodiment may comprise the following blocks.

At block S11: the UE in a non-connected state can receive an MBS start notification transmitted from a first base station.

In NR, a UE has three states referred to as RRC_CONNECTED, RRC_INACTIVE and RRC_IDLE, wherein RRC is the abbreviation of Radio Resource Control. The non-connected state comprises the RRC_INACTIVE state or the RRC_IDLE state.

The MBS start notification may be carried by at least one of one or more paging messages and one or more broadcast messages, wherein the one or more broadcast messages comprise at least one of one or more system information blocks (SIBs) and one or more multicast control channels (MCCHs). The one or more paging messages or one or more broadcast messages carrying the MBS start notification may comprise information (e.g. ID) of a corresponding MBS with additional information (service ID or TMGI) to avoid bringing UEs to the RRC_CONNECTED state unnecessarily. The subsequent blocks may only be executed if the UE is interested in the MBS.

A CN-RAN (radio access network) connection is still established for the UE in RRC_INACTIVE state. The base station which keeps the CN-RAN connection for the UE and stores a context of the UE (hereinafter referred to as UE context) is referred to as the anchor base station. At the same time, CN regards the UE as ECM_CONNECTED, which means the CN thinks the UE is connected to the anchor base station, wherein ECM is the abbreviation of EPS Connection Management and EPS is the abbreviation of Evolved Packet System. When the MBS start notification is carried by the one or more paging messages, only RAN paging messages are used for UE in the RRC_INACTIVE state, both RAN paging messages and CN paging messages can be used for the UE in the RRC_INACTIVE state. In other words, one or more paging messages are one or more RAN paging messages in response to the UE being in the RRC_INACTIVE state, and the one or more paging messages may comprise one or more RAN messages and one or more CN paging messages in response to the UE being in the RRC_IDLE state. The paging could be individually paging, or the group paging mechanism can be adopted to improve efficiency. Group IDs (including group-ng-5G-S-TMSI and group-full-RNTI) can be used for group paging. Upper layer message provides UEs interested in the same services with same Group IDs (Group-ng-5G-S-TMSI). The discontinuous reception (DRX) for the paging can be more than 1 DRX cycle to satisfy the latency requirement for MBS.

When the MBS start notification is carried by one or more MCCHs, the UE may receive the one or more SIBs transmitted from the first base station, wherein the one or more SIBs carry a configuration for the one or more MCCHs, and receive the one or more MCCHs transmitted from the first base station based on the configuration for the one or more MCCHs.

In the present embodiment, the UE receive the MBS configuration in the RRC_CONNECTED state. To transit the UE from the non-connected state to the RRC_CONNECTED state, the MBS start notification is transmitted to inform the UE of state transition.

At block S12: the UE can establish a connection with the first base station in response to the MBS start notification so as to transit from the non-connected state to the RRC_CONNECTED state.

A legacy random access mechanism may be adopted for RRC connection establishment.

At block S13: the UE in the RRC_CONNECTED state can receive a first MBS configuration transmitted from the first base station.

The first MBS configuration may be carried by at least one of one or more dedicated messages and the one or more broadcast messages. The one or more dedicated messages comprise at least one of one or more RRC messages, one or more media access control (MAC) control elements and one or more downlink control information (DCI).

At block S14: the UE can receive a plurality of MBS data transmitted from the first base station based on the first MBS configuration.

With implement of the present embodiment, the UE may receive the MBS configuration in the RRC_CONNECTED state, and use the MBS configuration for receiving subsequent MBS data. The RRC_CONNECTED state provides more reliable transmission than the non-connected state, therefore the reliability of the MBS can be improved.

Figure 4:
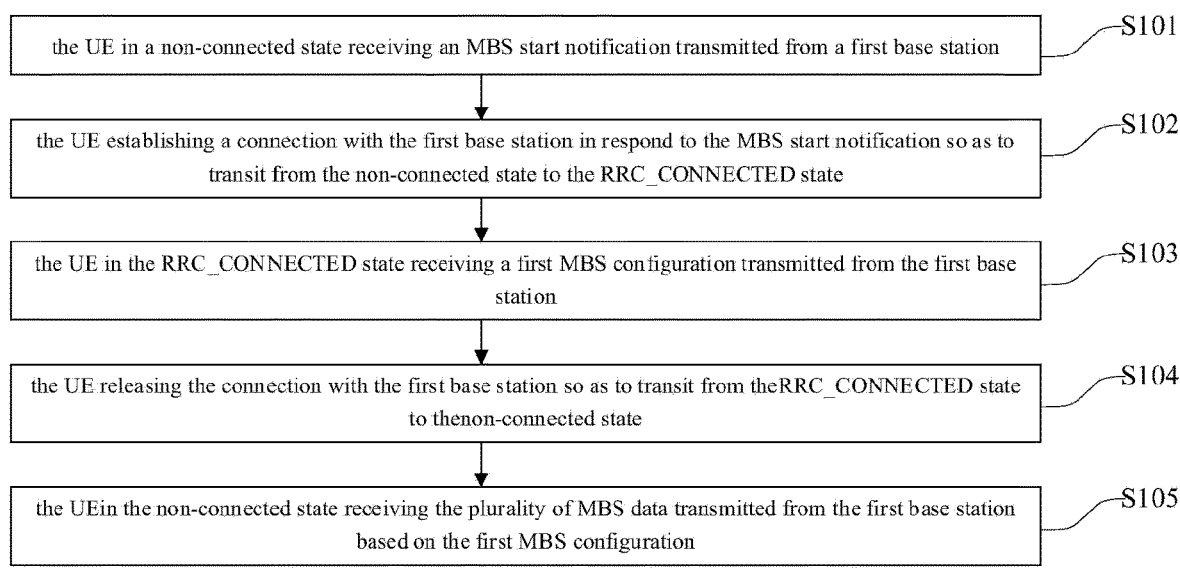
FIG. 4 is a flow chart illustrating a second embodiment of the MBS processing method according to the present disclosure.

Referring to FIG. 4, FIG. 4 is a flow chart illustrating a second embodiment of the MBS processing method according to the present disclosure. The present embodiment is a further extension of the first embodiment of the MBS processing method according to the present disclosure, and the same portions are not repeated. The method according to the present embodiment may comprise the following blocks.

At block S101: the UE in a non-connected state can receive an MBS start notification transmitted from a first base station.

At block S102: the UE can establish a connection with the first base station in response to the MBS start notification so as to transit from the non-connected state to the RRC_CONNECTED state.

At block S103: the UE in the RRC_CONNECTED state can receive a first MBS configuration transmitted from the first base station.

At block S104: the UE can release the connection with the first base station so as to transit from the RRC_CONNECTED state to the non-connected state.

At block S105: the UE in the non-connected state can receive the plurality of MBS data transmitted from the first base station based on the first MBS configuration.

In the present embodiment, the UE receives the MBS data in the non-connected state.

Figure 5:
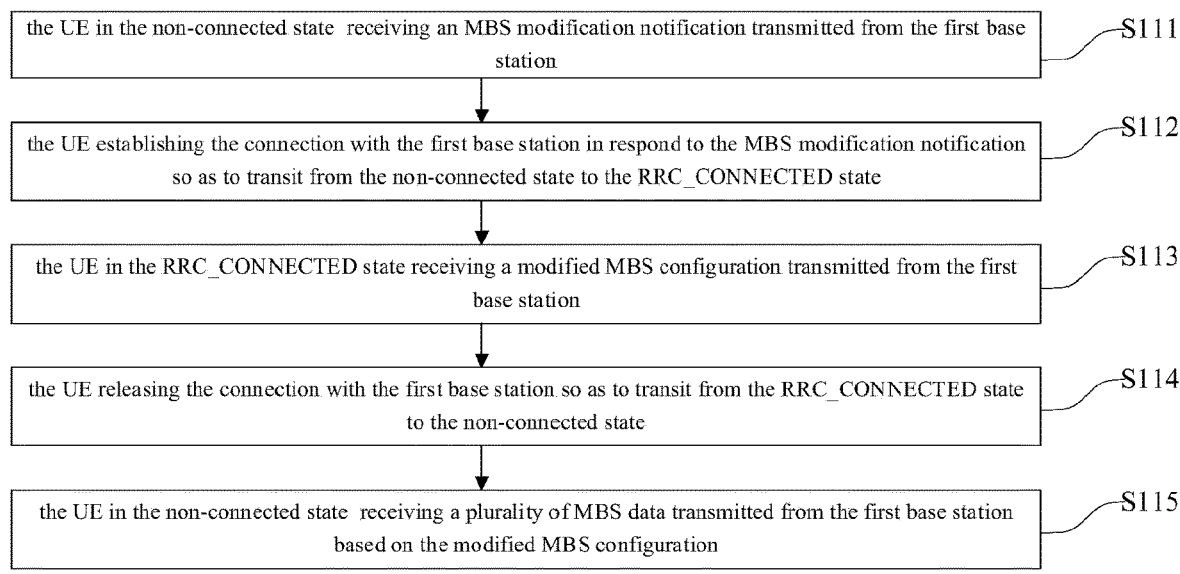
FIG. 5 is a flow chart illustrating a third embodiment of the MBS processing method according to the present disclosure.

Referring to FIG. 5, FIG. 5 is a flow chart illustrating a third embodiment of the MBS processing method according to the present disclosure. The present embodiment is based on the second embodiment of the MBS processing method according to the present disclosure and further comprises the following blocks.

At block S111: the UE in the non-connected state can receive an MBS modification notification transmitted from the first base station.

Since the UE receives the MBS data in the non-connected state, the MBS modification notification may be transmitted before a modified MBS configuration for informing the UE of state transition.

The MBS modification notification may be carried by at least one of one or more paging messages and one or more broadcast messages, wherein the one or more broadcast messages may comprise at least one of one or more SIBs and one or more MCCHs.

At block S112: the UE can establish the connection with the first base station in response to the MBS modification notification so as to transit from the non-connected state to the RRC_CONNECTED state.

At block S113: the UE in the RRC_CONNECTED state can receive a modified MBS configuration transmitted from the first base station.

The modified MBS configuration may be carried by at least one of one or more dedicated messages and the one or more broadcast messages, wherein the one or more dedicated messages comprise at least one of one or more RRC messages, one or more MAC control elements and one or more DCI. The dedicated messages are transmitted only to the UE while the broadcast messages are transmitted to multiple UEs.

At block S114: the UE can release the connection with the first base station so as to transit from the RRC_CONNECTED state to the non-connected state.

At block S115: the UE in the non-connected state can receive a plurality of MBS data transmitted from the first base station based on the modified MBS configuration.

Figure 6:
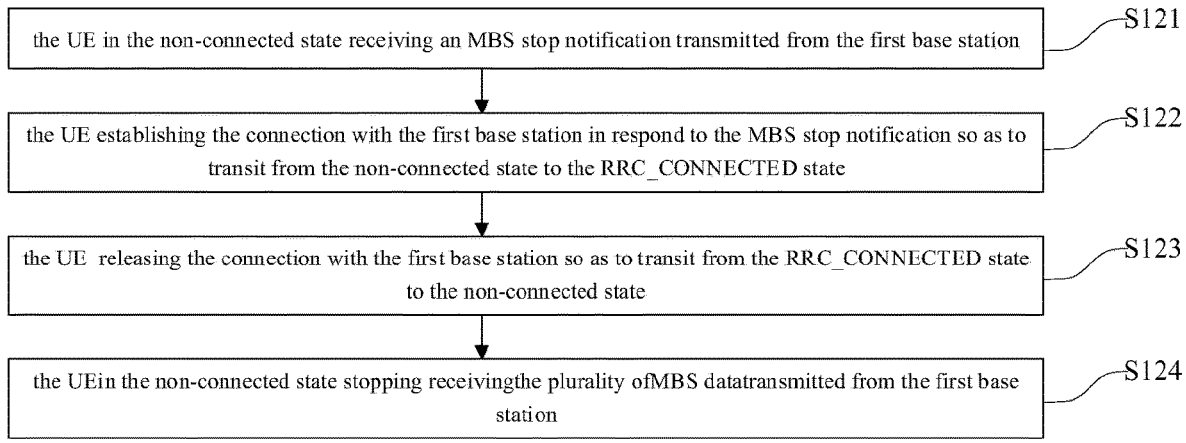
FIG. 6 is a flow chart illustrating a fourth embodiment of the MBS processing method according to the present disclosure.

Referring to FIG. 6, FIG. 6 is a flow chart illustrating a fourth embodiment of the MBS processing method according to the present disclosure. The present embodiment is based on the second embodiment of the MBS processing method according to the present disclosure and further comprises the following blocks.

At block S121: the UE in the non-connected state can receive an MBS stop notification transmitted from the first base station.

At block S122: the UE can establish the connection with the first base station Hs in response to the MBS stop notification so as to transit from the non-connected state to the RRC_CONNECTED state.

At block S123: the UE can release the connection with the first base station so as to transit from the RRC_CONNECTED state to the non-connected state.

The UE needs to establish the connection with the first base station if the MBS stop notification is carried by the one or more paging messages. When the MBS stop notification is carried by the one or more broadcast messages, the block S122 and S123 may be omitted.

At block S124: the UE in the non-connected state can stop receiving the plurality of MBS data transmitted from the first base station.

Figure 7:
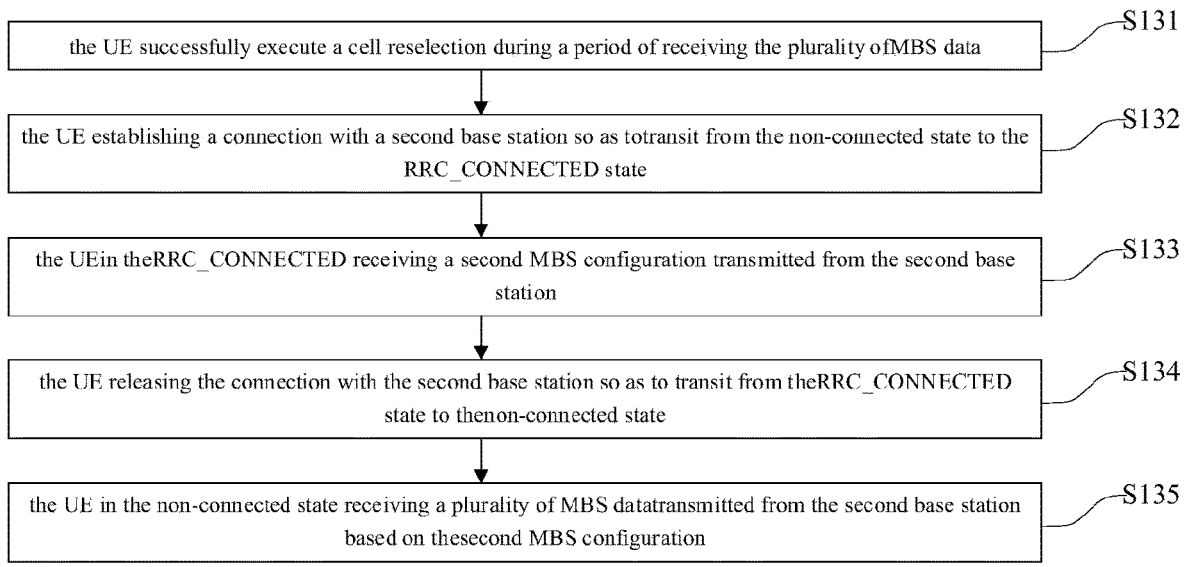
FIG. 7 is a flow chart illustrating a fifth embodiment of the MBS processing method according to the present disclosure.

Referring to FIG. 7, FIG. 7 is a flow chart illustrating a fifth embodiment of the MBS processing method according to the present disclosure. The present embodiment is based on the second embodiment of the MBS processing method according to the present disclosure and further comprises the following blocks.

At block S131: the UE can successfully execute a cell reselection during a period of receiving the plurality of MBS data.

When the UE is in the non-connected state, it may remain in a moving state, and thus move out of the range of the current camping cell. Under such circumstance, cell reselection is needed to change the camping cell for the UE.

At block S132: the UE can establish a connection with a second base station so as to transit from the non-connected state to the RRC_CONNECTED state.

The second base station is a target base station of the cell reselection, that is to say, the second base station is the base station for the new camping cell.

At block S133: the UE in the RRC_CONNECTED can receive a second MBS configuration transmitted from the second base station.

At block S134: the UE can release the connection with the second base station so as to transit from the RRC_CONNECTED state to the non-connected state.

At block S135: the UE in the non-connected state can receive a plurality of MBS data transmitted from the second base station based on the second MBS configuration.

Figure 8:
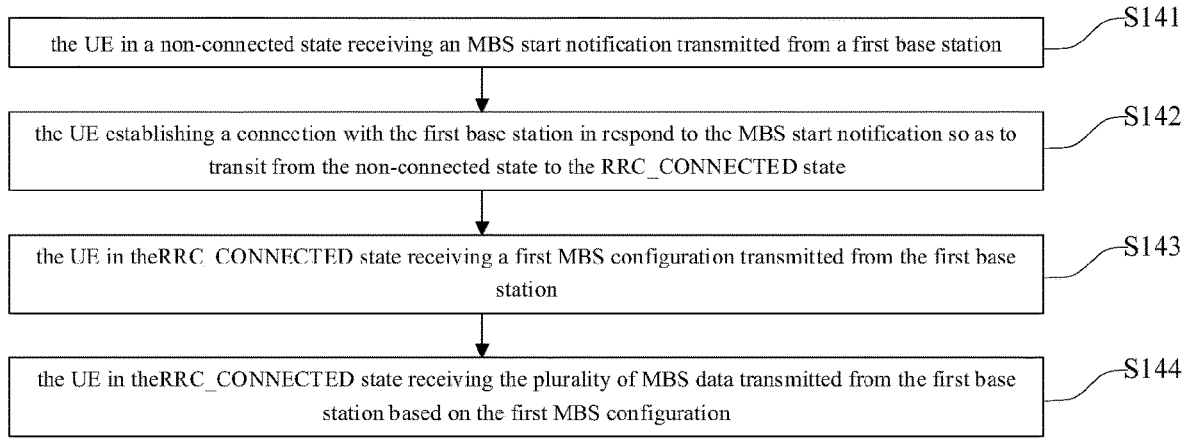
FIG. 8 is a flow chart illustrating a sixth embodiment of the MBS processing method according to the present disclosure.

Referring to FIG. 8, FIG. 8 is a flow chart illustrating a sixth embodiment of the MBS processing method according to the present disclosure. The present embodiment is a further extension of the first embodiment of the MBS processing method according to the present disclosure, and the same portions are not repeated. The method according to the present embodiment may comprise the following blocks.

At block S141: the UE in a non-connected state can receive an MBS start notification transmitted from a first base station.

At block S142: the UE can establish a connection with the first base station in response to the MBS start notification so as to transit from the non-connected state to the RRC_CONNECTED state.

At block S143: the UE in the RRC_CONNECTED state can receive a first MBS configuration transmitted from the first base station.

At block S144: the UE in the RRC_CONNECTED state can receive the plurality of MBS data transmitted from the first base station based on the first MBS configuration.

In the present embodiment, the UE receives the MBS data in the RRC_CONNECTED state.

Figure 9:
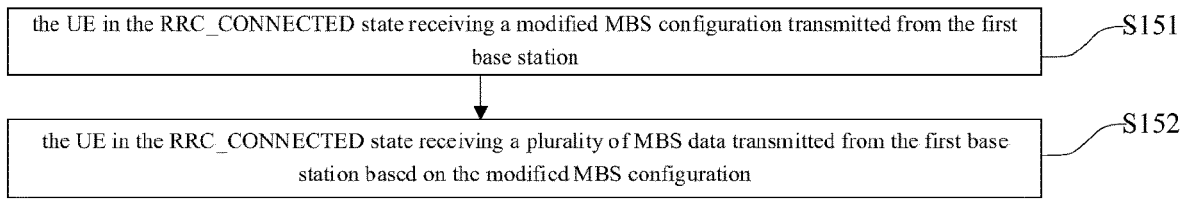
FIG. 9 is a flow chart illustrating a seventh embodiment of the MBS processing method according to the present disclosure.

Referring to FIG. 9, FIG. 9 is a flow chart illustrating a seventh embodiment of the MBS processing method according to the present disclosure. The present embodiment is based on the sixth embodiment of the MBS processing method according to the present disclosure and further comprises the following blocks.

At block S151: the UE in the RRC_CONNECTED state can receive a modified MBS configuration transmitted from the first base station.

The modified MBS configuration may be carried by at least one of one or more dedicated messages and one or more broadcast messages, wherein the one or more dedicated messages comprise at least one of one or more RRC messages, one or more MAC control elements and one or more DCI, and the one or more broadcast messages comprise at least one of one or more SIBs and one or more MCCHs.

At block S152: the UE in the RRC_CONNECTED state can receive a plurality of MBS data transmitted from the first base station based on the modified MBS configuration.

Figure 10:
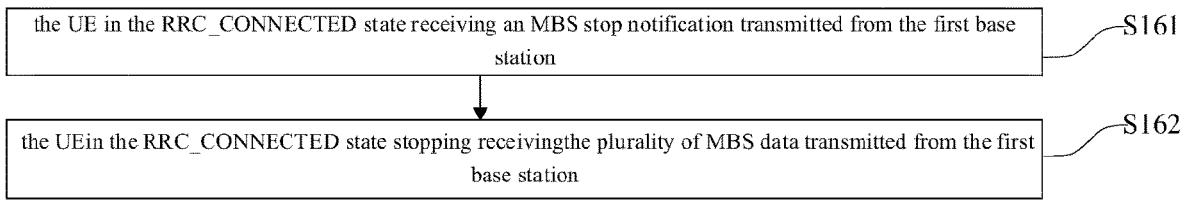
FIG. 10 is a flow chart illustrating an eighth embodiment of the MBS processing method according to the present disclosure.

Referring to FIG. 10, FIG. 10 is a flow chart illustrating an eighth embodiment of the MBS processing method according to the present disclosure. The present embodiment is based on the sixth embodiment of the MBS processing method according to the present disclosure and further comprises the following blocks.

At block S161: the UE in the RRC_CONNECTED state can receive an MBS stop notification transmitted from the first base station.

At block S162: the UE in the RRC_CONNECTED state can stop receiving the plurality of MBS data transmitted from the first base station.

Figure 11:
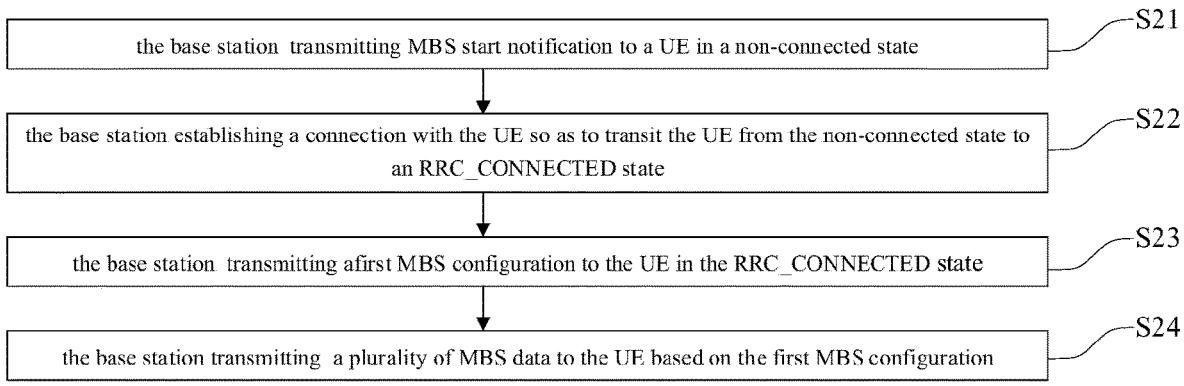
FIG. 11 is a flow chart illustrating a ninth embodiment of the MBS processing method according to the present disclosure.

Referring to FIG. 11, FIG. 11 is a flow chart illustrating a ninth embodiment of the MBS processing method according to the present disclosure. The present method can be executable in a base station. The general difference between the first embodiment of the MBS processing method according to the present disclosure and the present embodiment is that the first embodiment can be executable in the UE and the present method can be executable in the base station. Common features or portions in the present embodiment and the first embodiment may refer to the description of the first embodiment and will not be repeatedly described hereinafter. The method according to the present embodiment may comprise the following blocks.

At block 21: the base station can transmit an MBS start notification to a UE in a non-connected state.

In NR, a UE has three states referred to as RRC_CONNECTED, RRC_INACTIVE and RRC_IDLE, wherein RRC is the abbreviation of Radio Resource Control. The non-connected state comprises an RRC_INACTIVE state or an RRC_IDLE state. The base station can transmit the MBS start notification to a plurality of UEs in the non-connected state.

The MBS start notification may be carried by at least one of one or more paging messages and one or more broadcast messages, wherein the one or more broadcast messages comprise at least one of one or more SIBs and one or more MCCHs. The one or more paging messages or one or more broadcast messages carrying the MBS start notification may comprise information (e.g. ID) of a corresponding MBS.

At block 22: the base station can establish a connection with the UE so as to transit the UE from the non-connected state to an RRC_CONNECTED state.

At block 23: the base station can transmit a first MBS configuration to the UE in the RRC_CONNECTED state.

The first MBS configuration may be carried by at least one of one or more dedicated messages and the one or more broadcast messages, wherein the one or more dedicated messages comprise at least one of one or more RRC messages, one or more MAC control elements and one or more DCI.

At block 24: the base station can transmit a plurality of MBS data to the UE based on the first MBS configuration.

The base station can further transmit an MBS stop notification to the UE.

With implement of the present embodiment, the UE may receive the MBS configuration in the RRC_CONNECTED state, and use the MBS configuration for receiving subsequent MBS data. The RRC_CONNECTED state provides more reliable transmission than the non-connected state, therefore the reliability of the MBS can be improved.

Figure 12:
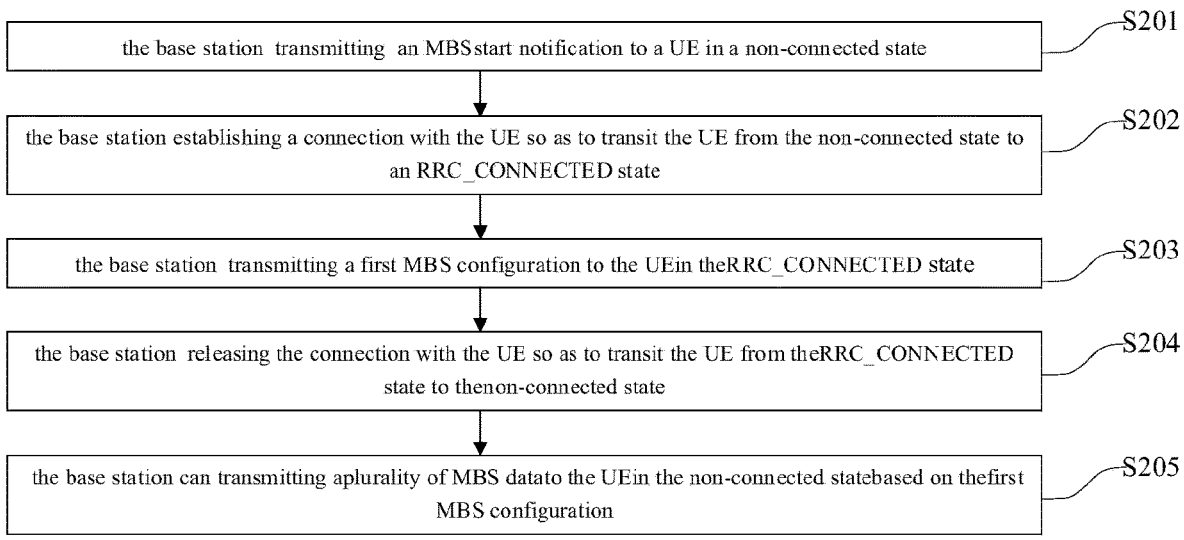
FIG. 12 is a flow chart illustrating a tenth embodiment of the MBS processing method according to the present disclosure.

Referring to FIG. 12, FIG. 12 is a flow chart illustrating a tenth embodiment of the MBS processing method according to the present disclosure. The present method is a further extension of the ninth embodiment of the MBS processing method according to the present disclosure, and the same portions are not repeated. The method according to the present embodiment may comprise the following blocks.

At block 201: the base station can transmit an MBS start notification to a UE in a non-connected state.

At block 202: the base station can establish a connection with the UE so as to transit the UE from the non-connected state to an RRC_CONNECTED state.

At block 203: the base station can transmit a first MBS configuration to the UE in the RRC_CONNECTED state.

At block 204: the base station can release the connection with the UE so as to transit the UE from the RRC_CONNECTED state to the non-connected state.

At block 205: the base station can transmit a plurality of MBS data to the UE in the non-connected state based on the first MBS configuration.

Figure 13:
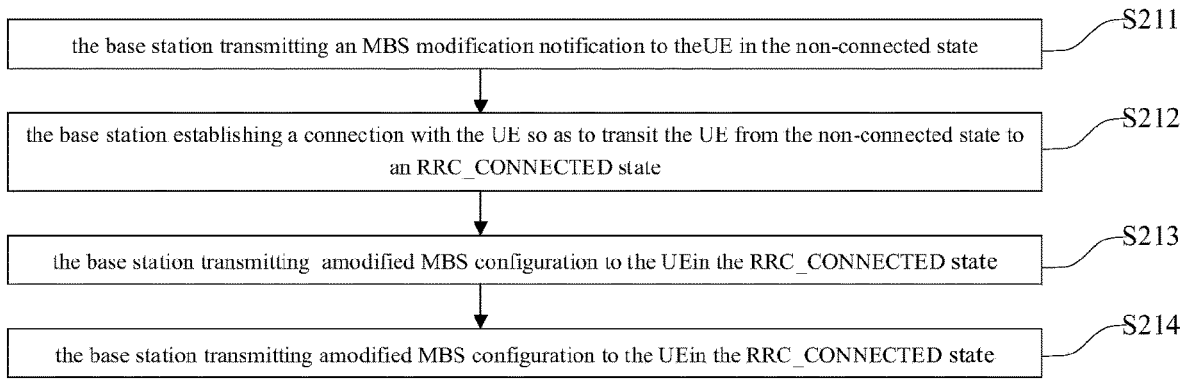
FIG. 13 is a flow chart illustrating an eleventh embodiment of the MBS processing method according to the present disclosure.

Referring to FIG. 13, FIG. 13 is a flow chart illustrating an eleventh embodiment of the MBS processing method according to the present disclosure. The present embodiment is based on the tenth embodiment of the MBS processing method according to the present disclosure and further comprises the following blocks.

At block 211: the base station can transmit an MBS modification notification to the UE in the non-connected state.

The MBS modification notification may be carried by at least one of one or more paging messages and one or more broadcast messages, wherein the one or more broadcast messages comprise at least one of one or more SIBs and one or more MCCHs.

At block 212: the base station can establish a connection with the UE so as to transit the UE from the non-connected state to an RRC_CONNECTED state.

At block 213: the base station can transmit a modified MBS configuration to the UE in the RRC_CONNECTED state.

The modified MBS configuration may be carried by at least one of one or more dedicated messages and the one or more broadcast messages, wherein the one or more dedicated messages comprise at least one of one or more RRC messages, one or more MAC control elements and one or more DCI.

Figure 14:
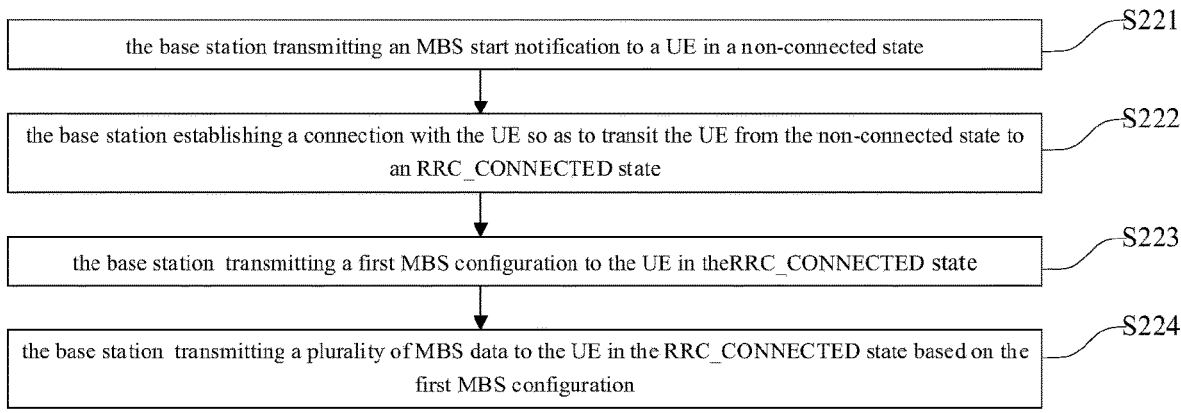
FIG. 14 is a flow chart illustrating a twelfth embodiment of the MBS processing method according to the present disclosure.

At block 214: the base station can transmit a plurality of MBS data to the UE based on the modified MBS configuration Referring to FIG. 14, FIG. 14 is a flow chart illustrating a twelfth embodiment of the MBS processing method according to the present disclosure. The present method is a further extension of the ninth embodiment of the MBS processing method according to the present disclosure, and the same portions are not repeated. The method according to the present embodiment may comprise the following blocks.

At block 221: the base station can transmit an MBS start notification to a UE in a non-connected state.

At block 222: the base station can establish a connection with the UE so as to transit the UE from the non-connected state to an RRC_CONNECTED state.

At block 223: the base station can transmit a first MBS configuration to the UE in the RRC_CONNECTED state.

At block 224: the base station can transmit a plurality of MBS data to the UE in the RRC_CONNECTED state based on the first MBS configuration.

Figure 15:
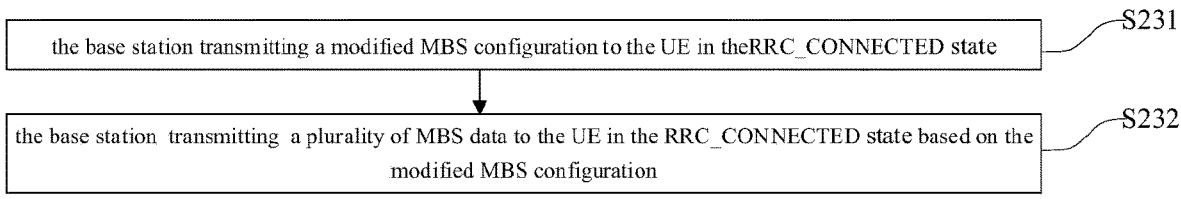
FIG. 15 is a flow chart illustrating a thirteenth embodiment of the MBS processing method according to the present disclosure.

Referring to FIG. 15, FIG. 15 is a flow chart illustrating a thirteenth embodiment of the MBS processing method according to the present disclosure. The present embodiment is based on the twelfth embodiment of the MBS processing method according to the present disclosure and further comprises the following blocks.

At block 231: the base station can transmit a modified MBS configuration to the UE in the RRC_CONNECTED state.

The modified MBS configuration may be carried by at least one of one or more dedicated messages and one or more broadcast messages. The one or more dedicated messages may comprise at least one of one or more RRC messages, one or more MAC control elements and one or more DCI, and the one or more broadcast messages comprise at least one of one or more SIBs and one or more MCCHs.

At block 232: the base station can transmit a plurality of MBS data to the UE in the RRC_CONNECTED state based on the modified MBS configuration.

Figure 16:
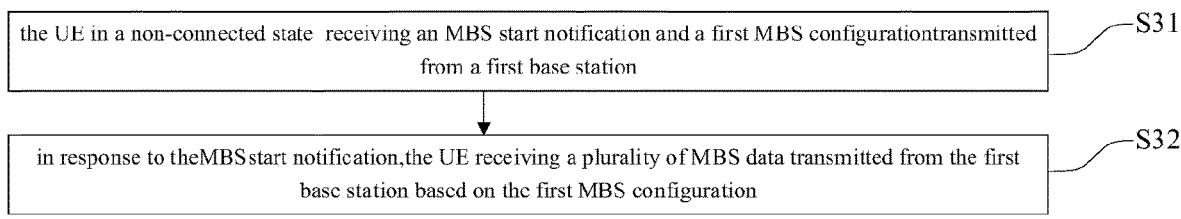
FIG. 16 is a flow chart illustrating a fourteenth embodiment of the MBS processing method according to the present disclosure.

Referring to FIG. 16, FIG. 16 is a flow chart illustrating a fourteenth embodiment of the MBS processing method according to the present disclosure. The present method can be executable in a UE. The method according to the present embodiment may comprise the following blocks.

At block S31: the UE in a non-connected state can receive an MBS start notification and a first MBS configuration transmitted from a first base station.

The non-connected state comprises the RRC_INACTIVE state or the RRC_IDLE state.

The MBS start notification may be carried by at least one of a RRC connection release message and one or more broadcast messages, wherein the one or more broadcast messages comprise at least one of one or more SIBs and one or more MCCHs. The RRC connection release message or the one or more broadcast messages carrying the MBS start notification may comprise an identification of a corresponding MBS.

The first MBS configuration can be carried by at least one of the RRC connection release message and the one or more broadcast messages. The order in which the MBS start notification and the first MBS configuration are transmitted is not restricted.

For MCCH, the UE may receive the one or more SIBs carrying the configuration for the one or more MCCHs and receive the one or more MCCHs from the first base station based on the configuration for the one or more MCCHs.

At block S32: in response to the MBS start notification, the UE can receive a plurality of MBS data transmitted from the first base station based on the first MBS configuration.

The UE can receive the plurality of MBS data in the non-connected state or the RRC_CONNECTED state.

The UE can further receive an MBS stop notification and/or a modified MBS configuration from the base station.

In the present embodiment, the UE is configured to receive the MBS configuration in the non-connected state. Under the circumstance that the UE receives the MBS data in the RRC_CONNECTED state and the transmission of the MBS stop notification and/or the modified MBS configuration is required, the UE may receive the MBS stop notification and/or the modified MBS configuration while staying in the RRC_CONNECTED state; or the UE may transit to the non-connected state to receive the MBS stop notification and/or the modified MBS configuration, and then transit to RRC_CONNECTED state for receiving MBS data if the modified MBS configuration is received or stop receiving MBS data if the MBS stop notification is received.

With implement of the present embodiment, the UE may receive the MBS configuration in the non-connected state using a simplified manner. The RRC connection release message and/or the one or more broadcast messages carrying the MBS start notification and the first MBS configuration brings less signaling overhead than the legacy SC-PTM mechanism, therefore the latency of the MBS can be reduced. In some embodiments, the legacy SC-PTM mechanism may be adopted for the MBS start notification or the first MBS configuration.

Figure 17:
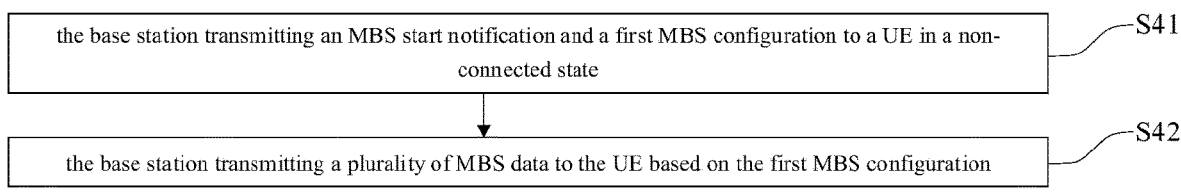
FIG. 17 is a flow chart illustrating a fifteenth embodiment of the MBS processing method according to the present disclosure.

Referring to FIG. 17, FIG. 17 is a flow chart illustrating a fifteenth embodiment of the MBS processing method according to the present disclosure. The present method can be executable in a base station. The general difference between the fourteenth embodiment of the MBS processing method according to the present disclosure and the present embodiment is that the fourteenth embodiment can be executable in the UE and the present method can be executable in the base station. Common features or portions in the present embodiment and the fourteenth embodiment may refer to the description of the first embodiment and will not be repeatedly described hereinafter. The method according to the present embodiment may comprise the following blocks. The method according to the present embodiment may comprise the following blocks.

At block S41: the base station can transmit an MBS start notification and a first MBS configuration to a UE in a non-connected state.

The non-connected state comprises an RRC_INACTIVE state or an RRC_IDLE state.

The MBS start notification may be carried by at least one of a RRC connection release message and one or more broadcast messages, wherein the one or more broadcast messages comprise at least one of one or more SIBs and one or more MCCHs. The RRC connection release message or the one or more broadcast messages carrying the MBS start notification may comprise an identification of a corresponding MBS.

The first MBS configuration can be carried by at least one of the RRC connection release message and the one or more broadcast messages. The order in which the MBS start notification and the first MBS configuration are transmitted is not restricted.

At block S42: the base station can transmit a plurality of MBS data to the UE based on the first MBS configuration.

With implement of the present embodiment, the UE may receive the MBS configuration in the non-connected state using a simplified manner. The RRC connection release message and/or the one or more broadcast messages carrying the MBS start notification and the first MBS configuration brings less signaling overhead than the legacy SC-PTM mechanism, therefore the latency of the MBS can be reduced. In some embodiments, the legacy SC-PTM mechanism may be adopted for the MBS start notification or the first MBS configuration.

Figure 18:
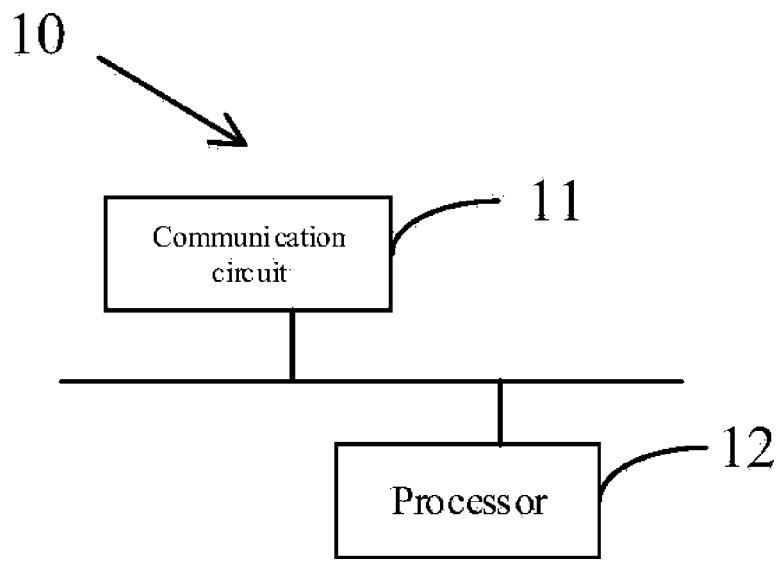
FIG. 18 is a structural schematic view of a communication apparatus according to an embodiment of the present disclosure.

Referring to FIG. 18, FIG. 18 is a structural schematic view of a communication apparatus according to an embodiment of the present disclosure. The communication apparatus 10 includes a processor 12 and a communication circuit 11; the processor 12 is connected to the communication circuit 11, and the processor 12 is configured to execute instructions to implement any one of the aforementioned MBS processing methods.

The processor 12 may comprise one or more instances of a processing circuit, i.e., a Central Processing Unit (CPU), a processing unit, a processing circuit, a processor, an Application Specific Integrated Circuit (ASIC), a microprocessor, or other processing logic that may interpret and execute instructions. The herein utilized expression "processor" may thus represent a processing circuitry comprising a plurality of processing circuits, such as, e.g., any, some or all of the ones enumerated above.

Figure 19:
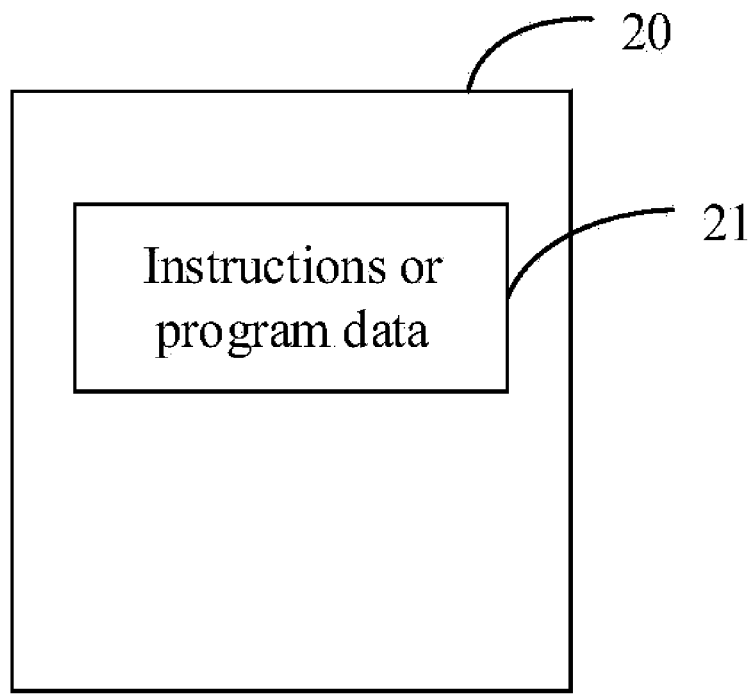
FIG. 19 is a structural schematic view of a non-transitory storage medium according to an embodiment of the present disclosure.

Referring to FIG. 19, FIG. 19 is a structural schematic view of a non-transitory storage medium according to an embodiment of the present disclosure. The non-transitory storage medium stores instructions or program data 21 which are capable of being executed to implement any one of the aforementioned MBS processing methods according to the present disclosure. The non-transitory storage medium 12 may be a read-only memory (ROM), a random-access memory (RAM), a flash memory, a hard disk, or an optical disk, etc.

It can be appreciated that the apparatuses and methods disclosed herein can also be implemented in other forms. Rather, the apparatuses as described are merely illustrative. For example, the division of modules or units is performed solely based on logic functions, thus in actual implementations there may be other division methods, e.g., multiple units or components may be combined or integrated onto another system, or some features may be ignored or simply not executed. In addition, mutual couplings, direct couplings, or communications connections as displayed or discussed may be achieved through some interfaces, devices, or units, and may be achieved electrically, mechanically, or in other forms. Separated units as described may or may not be physically separated. Components displayed as units may or may not be physical units, and may reside at one location or may be distributed to multiple networked units. Part or all of the units may be selectively adopted according to actual requirements to achieve objectives of the disclosure.

Additionally, various functional units described herein may be integrated into one processing unit or may be present as a number of physically separated units, and two or more units may be integrated into one. The integrated units may be implemented by hardware or as software functional units.

If the integrated units are implemented as software functional units and sold or used as standalone products, they may be stored in a computer readable storage medium. On the basis of such an understanding, the essential technical solution or all or part of the technical solution of the disclosure may be embodied as software products. Computer software products can be stored in a storage medium and can include multiple instructions enabling a computing device (e.g., a personal computer, a server, a network device, etc.) or a processor to execute all or part of the methods as described in the disclosure. The storage medium may include all kinds of media that can store program codes, such as a USB flash disk, mobile hard drive, read-only memory (ROM), random access memory (RAM), magnetic disk, or optical disk.

The above description merely illustrates some exemplary embodiments of the disclosure, which however are not intended to limit the scope of the disclosure to these specific embodiments. Any equivalent structural or flow modifications or transformations made to the disclosure, or any direct or indirect applications of the disclosure on any other related fields, shall all fall in the scope of the disclosure.

What is claimed is:

1. A multicast broadcast service (MBS) processing method executable in a user equipment (UE), comprising:
   receiving, in a non-connected state, an MBS start notification transmitted from a first base station, wherein the non-connected state comprises an Radio Resource Control_INACTIVE state or an RRC_IDLE state;
   establishing a connection with the first base station in response to the MBS start notification so as to transit from the non-connected state to an RRC_CONNECTED state;
   receiving, in the RRC_CONNECTED state, a first MBS configuration transmitted from the first base station; and
   receiving a plurality of MBS data transmitted from the first base station based on the first MBS configuration;
   wherein the MBS processing method comprises:
   receiving the MBS start notification only in the non-connected state, which comprises the RRC_INACTIVE state or the RRC_IDLE state, and maintaining context information with the first base station;
   wherein the MBS start notification and the first MBS configuration are transmitted only via system information block (SIB) or multicast control channel (MCCH);
   wherein, in the RRC_CONNECTED state, the MBS configuration is transmitted only via the RRC message;
   wherein, based on the first MBS configuration, the MBS data is received only via the MCCH;
   wherein the first MBS configuration is carried only via the RRC connection release message;
   wherein, in the non-connected state, the UE receives an MBS modification notification and establishes an RRC connection after receiving the MBS modification notification to update the MBS configuration; and
   wherein, in the non-connected state, the UE receives an MBS stop notification.

2. The method of claim 1, wherein the receiving the plurality of MBS data transmitted from the first base station based on the first MBS configuration comprises:
   releasing the connection with the first base station so as to transit from the RRC_CONNECTED state to the non-connected state; and
   receiving, in the non-connected state, the plurality of MBS data transmitted from the first base station based on the first MBS configuration.

3. The method of claim 2, further comprising:
   receiving, in the non-connected state, an MBS modification notification transmitted from the first base station;
   establishing the connection with the first base station in response to the MBS modification notification so as to transit from the non-connected state to the RRC_CONNECTED state;
   receiving, in the RRC_CONNECTED state, a modified MBS configuration transmitted from the first base station;
   releasing the connection with the first base station so as to transit from the RRC_CONNECTED state to the non-connected state; and
   receiving, in the non-connected state, a plurality of MBS data transmitted from the first base station based on the modified MBS configuration.

4. The method of claim 3, wherein the MBS modification notification is carried by at least one of one or more paging messages and one or more broadcast messages, wherein the one or more broadcast messages comprise at least one of one or more system information blocks (SIBs) and one or more multicast control channels (MCCHs); and
   the modified MBS configuration is carried by at least one of one or more dedicated messages and the one or more broadcast messages, wherein the one or more dedicated messages comprise at least one of one or more RRC messages, one or more media access control (MAC) control elements and one or more downlinkcontrol information (DCI).

5. The method of claim 2, further comprising:
receiving, in the non-connected state, an MBS stop notification transmitted from the first base station; and
stopping receiving, in the non-connected state, the plurality of MBS data transmitted from the first base station.

6. The method of claim 2, further comprising:
receiving, in the non-connected state, an MBS stop notification transmitted from the first base station;
establishing the connection with the first base station in response to the MBS stop notification so as to transit from the non-connected state to the RRC_CONNECTED state;
releasing the connection with the first base station so as to transit from the RRC_CONNECTED state to the non-connected state; and
stopping receiving, in the non-connected state, the plurality of MBS data transmitted from the first base station.

7. The method of claim 2, further comprising:
in response to a cell reselection being successfully executed during a period of receiving the plurality of MBS data, establishing a connection with a second base station so as to transit from the non-connected state to the RRC_CONNECTED state, wherein the second base station is a target base station of the cell reselection;
receiving, in the RRC_CONNECTED state, a second MBS configuration transmitted from the second base station;
releasing the connection with the second base station so as to transit from the RRC_CONNECTED state to the non-connected state; and
receiving, in the non-connected state, a plurality of MBS data transmitted from the second base station based on the second MBS configuration.

8. The method of claim 1, wherein the receiving the plurality of MBS data transmitted from the first base station based on the first MBS configuration comprises:
receiving, in the RRC_CONNECTED state, a plurality of MBS data transmitted from the first base station based on the modified MBS configuration.

9. The method of claim 8, further comprising:
receiving, in the RRC_CONNECTED state, a modified MBS configuration transmitted from the first base station; and
receiving, in the RRC_CONNECTED state, a plurality of MBS data transmitted from the first base station based on the modified MBS configuration.

10. The method of claim 9, wherein the modified MBS configuration is carried by at least one of one or more dedicated messages and one or more broadcast messages, wherein the one or more dedicated messages comprise at least one of one or more RRC messages, one or more MAC control elements and one or more DCI, and the one or more broadcast messages comprise at least one of one or more SIBs and one or more MCCHs.

11. The method of claim 8, further comprising:
receiving, in the RRC_CONNECTED state, an MBS stop notification transmitted from the first base station; and
stopping receiving, in the RRC_CONNECTED state, the plurality of MBS data transmitted from the first base station.

12. The method of claim 1, wherein the MBS start notification is carried by at least one of one or more paging messages and one or more broadcast messages, wherein the one or more broadcast messages comprise at least one of one or more SIBs and one or more MCCHs; and
the first MBS configuration is carried by at least one of one or more dedicated messages and the one or more broadcast messages, wherein the one or more dedicated messages comprise at least one of one or more RRC messages, one or more MAC control elements and one or more DCI.

13. The method of claim 12, wherein the MBS start notification is carried by one or more MCCHs, the receiving in the non-connected state the MBS start notification transmitted from the first base station comprising:
receiving the one or more SIBs transmitted from the first base station, wherein the one or more SIBs carry a configuration for the one or more MCCHs; and
receiving the one or more MCCHs transmitted from the first base station based on the configuration for the one or more MCCHs.

14. The method of claim 12, wherein the one or more paging messages or one or more broadcast messages carrying the MBS start notification comprise an identification of a corresponding MBS.

15. The method of claim 12, wherein the one or more paging messages are one or more group paging messages.

16. The method of claim 12, wherein the one or more paging messages are one or more radio access network (RAN) paging messages in response to the UE being in the RRC_INACTIVE state, and the one or more paging messages comprises one or more RAN messages and one or more core network (CN) paging messages in response to the UE being in the RRC_IDLE state.

17. An a multicast broadcast service (MBS) processing method executable in a base station, comprising:
transmitting an MBS start notification to a UE in a non-connected state, wherein the non-connected state comprises an Radio Resource Control_INACTIVE state or an RRC_IDLE state;
establishing a connection with the UE so as to transit the UE from the non-connected state to an RRC_CONNECTED state;
transmitting a first MBS configuration to the UE in the RRC_CONNECTED state; and
transmitting a plurality of MBS data to the UE based on the first MBS configuration;
wherein the MBS processing method comprises:
sending the MBS start notification only in the non-connected state, which comprises the RRC_INACTIVE state or the RRC_IDLE state, and maintaining the context information between the UE and the base station;
wherein the MBS start notification and the first MBS configuration are transmitted only via system information block (SIB) or multicast control channel (MCCH);
wherein, in the RRC_CONNECTED state, the MBS configuration is transmitted only via the RRC message;
wherein, based on the first MBS configuration, the MBS data is transmitted only via the MCCH;
wherein the first MBS configuration is carried only via the RRC connection release message;
wherein, in the non-connected state, an MBS modification notification is transmitted to the UE; and
wherein, in the non-connected state, an MBS stop notification is transmitted to the UE.

18. The method of claim 17, wherein the transmitting the plurality of MBS data to the UE based on the first MBS configuration comprises:

releasing the connection with the UE so as to transit the UE from the RRC_CONNECTED state to the non-connected state; and transmitting the plurality of MBS data to the UE in the non-connected state based on the first MBS configuration.

19. A communication apparatus, comprising a processor and a communication circuit, wherein the processor is connected to the communication circuit;

the processor is configured to execute instructions to implement the method according claim 1.

20. A communication apparatus, comprising a processor and a communication circuit, wherein the processor is connected to the communication circuit;

the processor is configured to execute instructions to implement the method according claim 17.

* * * * *